US010354765B2

(12) United States Patent
Heres et al.

(10) Patent No.: US 10,354,765 B2
(45) Date of Patent: Jul. 16, 2019

(54) USE OF HYDROXYIMINOALKANOIC ACIDS AS ANTI-NITROUS AGENTS IN OPERATIONS OF REDUCTIVE STRIPPING OF PLUTONIUM

(71) Applicants: COMMISSARIAT À L'ÉNERGIE ATOMIQUE ET AUX ÉNERGIES ALTERNATIVES, Paris (FR); Orano Cycle, Courbevoie (FR)

(72) Inventors: Xavier Heres, Villeneuve les Avignon (FR); Gilles Bernier, Avignon (FR); Binh Dinh, Pont Saint Esprit (FR); Patrick Pochon, Saint-Laurent-des-Arbres (FR); Danièle Sans, Pont-Saint-Esprit (FR); Elisabeth Zekri, Orsay (FR)

(73) Assignees: COMMISSARIAT À L'ÉNERGIE ATOMIQUE ET AUX ENERGIES ALTERNATIVES, Paris (FR); ORANO CYCLE, Courbevoie (FR)

( * ) Notice: Subject to any disclaimer, the term of this patent is extended or adjusted under 35 U.S.C. 154(b) by 0 days.

(21) Appl. No.: 15/768,780

(22) PCT Filed: Oct. 18, 2016

(86) PCT No.: PCT/EP2016/074990
§ 371 (c)(1),
(2) Date: Apr. 16, 2018

(87) PCT Pub. No.: WO2017/067935
PCT Pub. Date: Apr. 27, 2017

(65) Prior Publication Data
US 2018/0286527 A1    Oct. 4, 2018

(30) Foreign Application Priority Data
Oct. 21, 2015 (FR) .................... 15 60047

(51) Int. Cl.
*G21C 19/46* (2006.01)
*C01G 56/00* (2006.01)
(Continued)

(52) U.S. Cl.
CPC .......... *G21C 19/46* (2013.01); *C01G 56/001* (2013.01); *G21F 9/06* (2013.01); *G21F 9/125* (2013.01); *Y02W 30/883* (2015.05)

(58) Field of Classification Search
CPC ............................ G21C 19/46; C01G 56/00
See application file for complete search history.

(56) References Cited

U.S. PATENT DOCUMENTS 3,356,698 A   12/1967  Lafont et al.
8,454,913 B2   6/2013  Dinh et al.
(Continued)

FOREIGN PATENT DOCUMENTS

FR   1349281 B   11/1962
WO   2006072729 A1   7/2006
(Continued)

OTHER PUBLICATIONS

U.S. Appl. No. 15/757,713 entitled Method for the Treatment of an Aqueous Nitric Solution Resulting From Dissolving Spent Nuclear Fuel, Said Method Being Performed in a Single Cycle and Without Requiring Any Operation Involving Reductive Stripping of Plutonium, filed Jan. 25, 2018.
(Continued)

*Primary Examiner* — Melissa S Swain
(74) *Attorney, Agent, or Firm* — Pearne & Gordon LLP (57) ABSTRACT

The use of hydroxyiminoalkanoic acids including at least four carbon atoms as anti-nitrous agents in operations of reductive stripping of plutonium. The invention may be useful in any method for processing spent nuclear fuels that includes one or more operations of reductive stripping of
(Continued)

plutonium and, more particularly, in the PUREX method as implemented in modern nuclear fuel processing plants, as well as in processes derived therefrom.

13 Claims, 3 Drawing Sheets

(51) Int. Cl.
*G21F 9/06* (2006.01)
*G21F 9/12* (2006.01)

(56) References Cited

U.S. PATENT DOCUMENTS

2008/0306153 A1 12/2008 Panzner et al.
2014/0072485 A1 3/2014 Luo et al.

FOREIGN PATENT DOCUMENTS

WO 2008148863 A1 11/2008
WO 2011000844 A1 6/2011

OTHER PUBLICATIONS

International Search Report for PCT/EP2016/074990 dated Jan. 13, 2017.
French Search Report for FR 1560047 dated Jul. 29, 2016.
Ishigaki, Akira et al. "Investigatin of the Reaction of Metal-Nitrosyl Complexes. I. New Nitrosolysis Reaction of Cycloalkanones Using Sodium Pentacyanonitrosylferrate (II)" In: Bulletin of hte Chemical Society fo Japan, 1977, vol. 50, No. 3. pp. 726-730.
Ayorinde, Folahan et al. "Synthesis of 12-Aminododecanoic and 11-Aminoundecanoic Acids from Vernolic Acid" in: JAOCS, 1997, vol. 74, No. 5, pp. 531-538.
Jackman, L.M. et al. "Synthesis and Chiroptical Properties of Some Piperidin-2-ones" in: J. Org. Chem. 1982, vol. 47, No. 10, pp. 1824-1831.
Thiele, Christoph et al. "Tracing Fatty Acid Metabolism by Click Chemistry" in: ACS Chemical Biology, 2012, vol. 7, pp. 2004-2011.
Rajabi, Mehdi et al. "Synthesis of a Series of Hydroxycarboxylic Acids as Standards for Oxidation of Nonanoic Acid" in: Synthetic Communication, 2014, vol. 44, pp. 1149-1154.
Utsukihara, Takamitsu et al. "Microwave-assisted synthesis of $\alpha$-hydroxy ketone and $\alpha$-diketone and pyrazine derivatives from $\alpha$-halo and $\alpha,\alpha'$-dibromo ketone" in: Tetrahedron Letters, 2006, vol. 47, pp. 9359-9364.
Carrera, Ignacio et al. "Microwave-assisted, solvent-free oxidative cleavage of $\alpha$-hydroxyketones" in: Tetrahedron Letters, 2009, vol. 50, pp. 5399-5402.
Bouet, Alexis et al. "New advances in stereoselective Meyers' lactamization. Application to the diastereoselective synthesis of $\beta$-substituted oxazoloazepinones" in: Tetrahedron: Asymmetry, 2008. vol. 19, pp. 2396-2401.

USE OF HYDROXYIMINOALKANOIC ACIDS AS ANTI-NITROUS AGENTS IN OPERATIONS OF REDUCTIVE STRIPPING OF PLUTONIUM

This is a National Stage application of PCT international application PCT/EP2016/074990, filed on Oct. 18, 2016 which claims the priority of French Patent Application No. 1560047, filed Oct. 21, 2015, both of which are incorporated herein by reference in their entirety.

TECHNICAL FIELD

The invention relates to the field concerning the processing of spent nuclear fuels.

More specifically, the invention relates to the use of hydroxyiminoalkanoic acids as anti-nitrous agents in reductive stripping operations of plutonium.

The invention can be applied to any method for processing spent nuclear fuels that includes one or more reductive stripping operations of plutonium.

Said operations are notably included in the PUREX method such as implemented in modern nuclear fuel processing plants (i.e. UP3 and UP2-800 plants in La Hague in France, and the Rokkasho plant in Japan) first to perform the U/Pu partitioning step of the first decontamination cycle of this method, and secondly to improve the plutonium decontamination of fission products in the plutonium purification cycle conventionally called «second plutonium cycle», following after this first decontamination cycle.

They are also included in a certain number of methods derived from this PUREX method, such as described for example in international application PCT WO 2006/072729 [1], known under the name COEX method, or the one described in international application PCT WO 2011/000844 [2].

STATE OF THE PRIOR ART

In the reductive stripping operations of plutonium that are implemented in the aforementioned methods for processing spent nuclear fuel, the plutonium is caused to pass from an organic phase (or solvent phase), in which it is at oxidation state IV, into an aqueous phase by reducing it to oxidation state III, a state in which its affinity for the organic phase is very low.

The reduction of plutonium(IV) to plutonium(III) is induced by a reducing agent that is added to the aqueous phase used for stripping and is stabilised with an anti-nitrous agent.

For the first decontamination cycle, for example of the PUREX method such as implemented in modern nuclear fuel reprocessing plants (that will more simply be called «PUREX method» in the remainder hereof), the reducing agent used to strip plutonium at the U/Pu partitioning step is uranium(IV) (or uranous nitrate), whilst the anti-nitrous agent is hydrazinium nitrate, also known as hydrazine.

The main chemical reactions to be taken into consideration are:

the reducing of plutonium(IV) to plutonium(III) by uranium(IV) (functional reaction):

the reoxidation of plutonium(III) to plutonium(IV) (parasitic reaction):

the destruction of nitrous acid to azothydric acid by hydrazine (useful reaction):

The two first reactions take place in the aqueous and organic phases, while the nitrous acid destruction reaction by hydrazine only takes place in the aqueous phase due to the inextractability of hydrazine by the organic phase, this phase being composed of tri-n-butyl phosphate (or TBP) at 30% (v/v) in hydrogenated tetrapropylene (or HTP).

The presence of plutonium(III) in the organic phase, even in small amount, catalyses oxidation of uranium(IV) via the two first reactions and thereby generates nitrous acid.

It was able to be ascertained, when conducting experimental studies in laboratory centrifuge extractors, that even with short extractor residence times (in the order of a few seconds), the consumption of uranium(IV) via oxidation is very high. This oxidation of uranium(IV) is essentially developed in the organic phase, since hydrazine is only contained in the aqueous phase. As a result, reductive stripping operating schemes of plutonium provide for a large excess of reducing agent.

The azothydric acid formed by the destruction reaction of nitrous acid by hydrazine reacts in turn with nitrous acid according to the reaction:

The kinetics of this reaction are much slower however than the destruction of nitrous acid by hydrazine, which means that azothydric acid is found in the effluent aqueous and organic phases of the U/Pu partitioning step.

Therefore, since hydrazine is not extractable by the organic phase and therefore only acts in the aqueous phase, this leads to a high consumption of reagents and to the production of chemical species that impede the industrial application of the method.

To solve this problem, it was proposed in international application PCT WO 2008/148863 [3] to use a two-phase anti-nitrous system associating butanal oxime, also called butyraldehyde oxime or butyraldoxime, with hydrazine, the butanal oxime allowing the organic phase to be stabilised while hydrazine stabilises the aqueous phase.

While the use of butanal oxime, in association with hydrazine, affords a certain number of advantages, in particular in that it allows a notable reduction in the quantities of uranous nitrate and hydrazine needed to perform a reductive stripping of plutonium and thereby lessening the disadvantages related to the non-extraction of hydrazine in organic phase, it is not fully satisfactory however due to:

the relatively low extraction of butanal oxime by the organic phase, necessitating large quantities of this oxime to be added to the extractor in which the reductive stripping of plutonium takes place, if it is desired to obtain an efficient concentration of butanal oxime in the organic phase; in particular, at the U/Pu partitioning step, the extraction of butanal oxime by the organic phase is greatly diminished by the saturation of this phase with actinides, which finally makes the use of this oxime little adapted for the performing of this partitioning step;

the continued use of hydrazine in the aqueous phase; indeed, despite the fact that hydrazine is one of the most efficient anti-nitrous agents in aqueous phase, the use thereof is restrictive not only because of the problems previously indicated relating to the formation of azothydric acid, but also on account of its toxicity: hydrazine is effectively on the list of CMR substances, i.e. substances considered by Regulation (EC) 1907/2006 for the Registration, Evaluation, Authorisation and Restriction of Chemical products (REACH Regulation) as being potentially or proven to be cancerogenic, mutagenic and/or toxic for reproduction, and it is likely to be entered sooner or later into the list of substances subject to authorisation under Annex XIV of this Regulation, in which case the marketing and industrial use thereof will be prohibited unless specific exemption is given by the European Chemicals Agency (ECHA).

In addition, a reaction of butanal oxime with hydrazine, leading to the formation of a hydrazone, has been observed. This reaction reduces the performance of butanal oxime and leads to an over-consumption of these two reagents.

Having regard to the foregoing, the inventors have therefore set out to find compounds having high anti-nitrous properties but the use of which is free of the disadvantages brought by the use of hydrazine such as currently used in the PUREX method, or by the use of a two-phase butanal oxime/hydrazine system such as proposed in reference [3].

More specifically, they set themselves the objective that these compounds should be more extractable than hydrazine by an organic phase, in particular of the type used in the PUREX method (under the same conditions of temperature and pressure), including when this organic phase is saturated with actinides, so that it is possible (1) to reduce the quantities of these compounds needed for a reductive stripping of plutonium and (2) to use these compounds for a stripping of plutonium at the U/Pu partitioning step in the first decontamination cycle of the PU REX method as well as for a stripping of plutonium in the second plutonium cycle of this method.

They further set themselves the objective that these compounds should allow the use of hydrazine to be fully circumvented.

DESCRIPTION OF THE INVENTION

These objectives and others are reached with the invention that proposes using at least one hydroxyiminoalkanoic acid having at least 4 carbon atoms as anti-nitrous agent in a reductive stripping operation of plutonium.

It is recalled that the hydroxyiminoalkanoic acids are compounds meeting the general formula: O=C(OH)—(R)—CH=N—OH wherein R is an alkylene group having at least one carbon atom, this group possibly being straight-chain or branched when it comprises two or more carbon atoms.

In the present invention, any hydroxyiminoalkanoic acid may be suitable provided that the number of carbon atoms contained in the alkylene group represented by R is at least equal to 2.

However, it is preferred that the hydroxyiminoalkanoic acid should meet the above general formula wherein R is an alkylene group having 2 to 12 carbon atoms.

Further, it is preferred that the hydroxyiminoalkanoic acid should meet the above general formula wherein R is a straight-chain alkylene group having 3 to 8 carbon atoms.

Such hydroxyiminoalkanoic acids are:
5-hydroxyiminopentanoic acid of formula: O=C(OH)—$(CH_2)_3$—CH=N—OH;
6-hydroxyiminohexanoic acid of formula: O=C(OH)—$(CH_2)_4$—CH=N—OH;
7-hydroxyiminoheptanoic acid of formula: O=C(OH)—$(CH_2)_5$—CH=N—OH;
8-hydroxyiminooctanoic acid of formula: O=C(OH)—$(CH_2)_6$—CH=N—OH;
9-hydroxyiminononanoic acid of formula: O=C(OH)—$(CH_2)_7$—CH=N—OH; and
10-hydroxyiminodecanoic acid of formula: O=C(OH)—$(CH_2)_8$—CH=N—OH.

Among these, particular preference is given to 6-hydroxyiminohexanoic acid and 8-hydroxyiminooctanoic acid.

Conforming to the invention, the operation for reductive stripping of plutonium preferably comprises:
contacting an organic, non-water-miscible phase comprising an extracting agent and plutonium at oxidation state IV in an organic diluent, with an aqueous phase comprising a reducing agent capable of reducing plutonium (IV) to plutonium(III) and nitric acid, one of the organic and aqueous phases additionally comprising the hydroxyiminoalkanoic acid; then
separating the so contacted organic and aqueous phases.

In the invention, the reducing agent contained in the aqueous phase is preferably selected from among uranium (IV), hydroxylammonium nitrate also called hydroxylamine nitrate, alkylated derivatives of hydroxylamine, ferrous sulfamate and sulfamic acid.

Among these reducing agents, uranium(IV) and hydroxylammonium nitrate are particularly preferred, these being the two agents used to reduce plutonium(IV) to plutonium (III) in the PUREX method, the first at the U/Pu partitioning step of the first decontamination cycle, the second at the second plutonium cycle.

Also, the extracting agent is preferably a tri-n-alkyl phosphate and better still TBP, whilst the organic diluent is preferably a straight-chain or branched dodecane, such as n-dodecane or HTP, an isoparaffinic solvent such as Isane IP185, Isane IP165 or Isopar L, or kerosene, in which case the extracting agent is preferably contained in a proportion of 30% (v/v) in this organic diluent.

Whichever the case, the hydroxyiminoalkanoic acid is used at a concentration preferably ranging from 0.01 mol/L to 3 mol/L and, better still, from 0.03 mol/L to 0.5 mol/L of organic or aqueous phase, whilst the reducing agent is used at a concentration preferably ranging from 0.02 mol/L to 0.6 mol/L and, better still, from 0.05 mol/L to 0.4 mol/L of aqueous phase.

Regarding the nitric acid, this is advantageously contained in the aqueous phase at a concentration ranging from 0.05 mol/L to 2 mol/L.

According to one particularly preferred provision of the invention, the reductive stripping of plutonium is preferably one of the plutonium stripping operations of the PUREX method or COEX method.

The hydroxyiminoalkanoic acids useful in the invention can be obtained with synthesis methods known in the state of the prior art.

For example, they can particularly be obtained via:
nitrosation/hydrolysis of the corresponding cycloalkanones, for example such as described in French patent 1 349 281 [4] and by Ishigaki et al. (*Bull. Chem. Soc. Jap.*, 1977, 50(3), 726-730 [5]); or else
reaction of hydroxylamine on the corresponding oxoalkanoic acids, for example as described by Ayorinde et al. (*J. Am. Oil Chem. Soc.*, 1997, 74(5), 531-538, [6]) and by Jackman et al. (*J. Org. Chem.*, 1982, 47(10), 1824-1831, [7]), the oxoalkanoic acids themselves possibly being obtained:
either by treatment of the corresponding bromoalkanoic acids with potassium hydroxide, for example as described by Thiele et al. (*ACS Chem. Biol.*, 2012, 7(12), 2004-2011, [8]), followed by controlled oxidation of the hydroxyalkanoic acids resulting from this treatment, for example as described by Panzer et al. (US patent application 2008/0306153, [9]) and by Rajabi et al. (*Synth. Comm.*, 2014, 44(8), 1149-1154, [10]);

or via microwave irradiation of the corresponding 2-halogenocycloalkanones, for example as described by Utsukihara et al. (*Tet. Lett.*, 2006, 47(52), 9359-9364, [11]), followed by oxidization by sodium periodate of the 2-hydroxy-cycloalkanones resulting from this irradiation, for example as described by Carrera et al. (*Tet. Lett.*, 2009, 50(38), 5399-5402, [12]);

or further, in the case of 6-oxohexanoic acid, via oxidation by sodium periodate of 2-hydroxycyclohexanone in its dimer form, for example as described by Bouet et al. (*Tet. Asym.*, 2008, 19(20), 2396-2401, [13]).

The invention affords numerous advantages. Indeed, it offers a range of anti-nitrous agents that are capable of most efficiently blocking the reoxidation of plutonium(III) to plutonium(IV) both in aqueous phase and in organic phase, as well as blocking the oxidation of a reducing agent, such as uranium(IV), by nitrous acid.

Therefore, in addition to the fact that the invention allows reductive stripping operations of plutonium to be carried out without the use of hydrazine, whether for an operation such as the one implemented at the U/Pu partitioning step of the PUREX method or an operation such as the one implemented at the second plutonium cycle of this same method, it also allows a very strong reduction in the quantities of reducing agent and anti-nitrous agent needed to perform these operations compared with the quantities required when the anti-nitrous agent is hydrazine.

The invention therefore allows the envisaging of a reduction in the number of points required for adding these anti-nitrous agents to equipment dedicated to reductive stripping operations of plutonium, and hence a simplification of this equipment.

In addition, due to the presence of a carboxylic acid function in the molecules of hydroxyiminoalkanoic acids, the management of these anti-nitrous agents downstream of a reductive stripping operation of plutonium is simple since they are easily solubilised in a basic aqueous phase of the type used to process the organic phase derived from the stripping of uranium(VI) for recycling thereof in a typical scheme of the PUREX method.

Other characteristics and other advantages of the invention will become better apparent on reading the following examples.

Evidently, these examples are only given as illustrations of the subject of the invention and are not in any manner limiting in respect thereof.

DETAILED DESCRIPTION OF PARTICULAR EMBODIMENTS

Example 1: Synthesis of 6-Hydroxyiminohexanoic and 8-Hydroxyiminooctanoic Acids

6-hydroxyiminohexanoic acid (also called «6-HIHA» in the remainder hereof) is synthesised applying the following reaction scheme:

where 2-hydroxycyclohexanone, denoted 1, commercially available in its dimer form (Sigma-Aldrich), is oxidized by sodium periodate (1.5 eq.) in a mixture of tetrahydrofuran and water, to give 6-oxohexanoic acid, denoted 2, with near-quantitative yield (98%); after dissolution in ethanol, the oxoacid 2 is reacted with hydroxylamine hydrochloride (8 eq.) in an aqueous medium and in the presence of sodium hydroxide (40° C., 1 hour), to give 6-HIHA with a yield of 60%.

The global yield over the two steps is 58%.

8-hydroxyiminooctanoic acid (also called «8-HIOA» in the remainder hereof) is synthesised applying the following reaction scheme:

where 8-bromooctanoic acid, denoted 1', commercially available (Sigma-Aldrich), is treated with potassium hydroxide (2.7 eq.) in a mixture of tetrahydrofuran and water under microwave irradiation (80° C., 90 W, 5 hours), to give 8-hydroxyoctanoic acid, denoted 2', with a yield of 76%; the hydroxyacid 2' is subjected to a controlled oxidation with 2-iodobenzoic acid (IBX, 1.5 eq.) in dimethylsulfoxide (ambient temperature, 4 hours) to give 8-oxooctanoic acid, denoted 3', with a yield of 73%; after dissolution in ethanol, the oxoacid 3' is reacted with hydroxylamine hydrochloride (8 eq.), in the presence of sodium hydroxide and in an aqueous medium (65° C., overnight), to give 8-HIOA with a yield of 78%.

The global yield of the three steps is 43%.

Example 2: Properties of 6-Hydroxyiminohexanoic and 8-Hydroxyiminooctanoic Acids 2.1—Coefficients of Distribution The coefficients of distribution, denoted D, of 6-HIHA and 8-HIOA are determined at an acidity close to 0.9 mol/L, this acidity representing the acidities at which most of the plutonium contained in the extractors dedicated to reductive stripping operations of plutonium is placed in the PUREX method.

For doing that, extraction tests were performed using:
two organic phases comprising 30% (v/v) of TBP in HTP, in the first of which 6-HIHA was solubilised in a proportion of 0.05 mol/L, and in the second of which 8-HIOA was solubilised in a proportion of 0.01 mol/L; and
two aqueous phases corresponding to two aliquots of one same aqueous solution of nitric acid at 1 mol/L.

Each of the organic phases was contacted with one of the two aqueous phases for 5 minutes, under agitation and at ambient temperature (22-25° C.), with an O/A (organic/aqueous) volume ratio of 1.3, after which the contacted phases were separated from one another.

The concentrations of 6-HIHA and 8-HIOA were measured in the aqueous phases (by high performance liquid chromatography) and in the organic phases (by gas phase chromatography) and the concentration of nitric acid was measured in the aqueous phases (by potentiometric titration with 0.1 M NaOH).

The same test was performed using an organic phase only comprising TBP (30%, v/v) in HTP and an aqueous phase comprising 1 mol/L nitric acid and 13 g/L of uranium(IV) (previously assayed by visible spectrophotometry, $\lambda=647$ nm). After separating the organic and aqueous phases, the concentration of uranium(IV) was measured in each of these phases (by visible spectrophotometry) as well as the concentration of nitric acid in the aqueous phase (by potentiometric titration).

The final acidity of all the aqueous phases was 0.9 mol/L of nitric acid.

Figure 1:
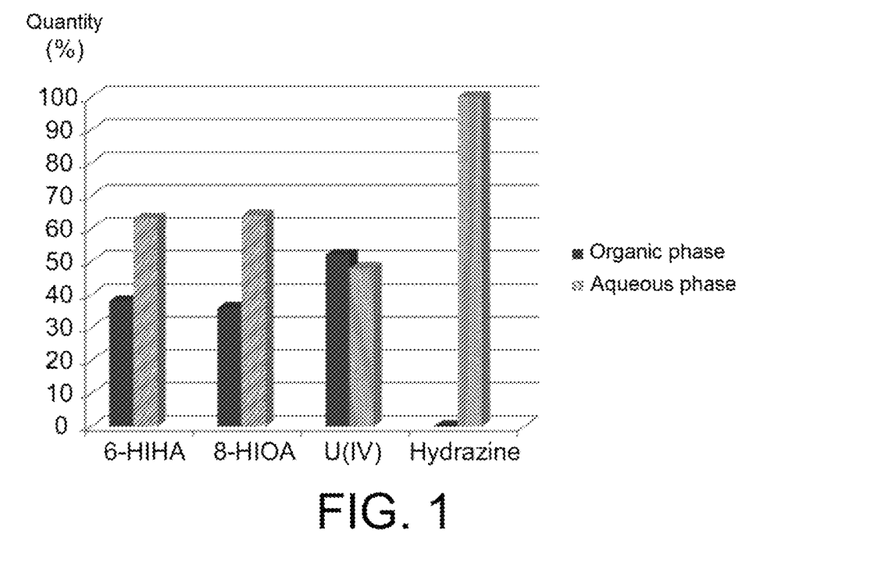
FIG. 1, in the form of a bar chart, illustrates the distribution of 6-hydroxyiminohexanoic acid (or 6-HIHA), 8-hydroxyiminooctanoic acid (or 8-HIOA), uranium(IV) and hydrazine between an organic phase comprising 30% (v/v) of TPB in HTP and an aqueous phase initially comprising 1 mol/L of nitric acid after contacting these phases for 5 minutes, under agitation and at ambient temperature.

FIG. 1 shows the quantities expressed in percentages of 6-NINA, 8-HIOA and uranium(IV) respectively found in the organic and aqueous phases.

This Figure, by way of indication, also shows the quantities of hydrazine found in organic phase and aqueous phase in a test conducted under similar conditions but using an organic phase only comprising TBP (30%, v/v) in HTP, an aqueous phase comprising 1 mol/L of nitric acid and 0.26 mol/L of hydrazine, in an O/A volume ratio of 2.

Taking into consideration the O/A volume ratio used for each test, the following coefficients of distribution were obtained:

$D_{6-HIHA}=0.43$;

$D_{8-HIOA}=0.45$;

$D_{U(IV)}=0.80$; and $D_{Hydrazine}=0$.

To allow a stabilisation of uranium(IV) both in the organic phase and in the aqueous phase, an anti-nitrous agent, irrespective of the phase in which it is initially contained, should be distributed between the organic and aqueous phases in the same manner as uranium(IV).

Yet, as shown in FIG. 1 and by the coefficients of distribution indicated above, 6-HIHA and 8-HIDA are properly distributed between the organic phase and aqueous phase, which is not the case for hydrazine which is not TBP-extractable.

The «protective» effect of the hydroxyiminoalkanoic acids against oxidation of uranium(IV) by nitrous acid is therefore more advantageous than that provided by hydrazine which, because it remains in aqueous phase, is not capable of destroying the nitrous acid that is likely to oxidize uranium(IV) in the organic phase.

2.2—Stabilisation of the Actinides by 6-Hydroxyiminohexanoic and 8-Hydroxyiminooctanoic Acids To verify the capability of 6-HIHA and 8-HIOA to stabilise uranium(IV) and plutonium(III) under chemical conditions close to those in which the reductive stripping of plutonium is conducted in the PUREX method, three reductive stripping tests of plutonium(IV) were carried out starting with four different organic phases, namely:

a first organic phase comprising 30% (v/v) of TBP in HTP and 10 g/L of plutonium(IV), this plutonium having been previously extracted from an aqueous 1 M nitric acid solution (contact time: 10 min, under agitation and at ambient temperature);

a second organic phase comprising 30% (v/v) of TBP in HTP and 0.26 mol/L of 6-HIHA;

a third organic phase comprising 30% (v/v) of TBP in HTP and 0.26 mol/L of 8-HIOA; and a fourth organic phase only comprising TBP in a proportion of 30% (v/v) in HTP.

For the first test, an aliquot of the first organic phase was mixed, volume by volume, for 10 seconds and at ambient temperature with the second organic phase, and 4 ml of the mixture obtained were contacted for 5 minutes under agitation and at ambient temperature with 3 mL of a first aqueous phase comprising 1 mol/L of nitric acid and 9 g/L of uranium(IV). Thereafter, the contacted phases were separated from each other.

The second test was performed in the same manner as the first but by replacing the second organic phase with the third organic phase.

For the third test, another aliquot of the first organic phase, volume by volume, was mixed for 10 seconds and at ambient temperature with the fourth organic phase; 6 mL of the mixture obtained was placed in contact for 5 minutes, under agitation and at ambient temperature, with 3 mL of a second aqueous phase comprising 1 mol/L of nitric acid, 13 g/L of uranium(IV) and 0.26 mol/L of hydrazine. Thereafter, the contacted phases were separated from each other.

Therefore, all the tests were conducted under identical initial conditions regarding acidity and concentrations of TBP, plutonium(IV) and uranium(IV), and with equivalent quantities of anti-nitrous agents (6-HIHA, 8-HIOA or hydrazine) in the organic phase/aqueous phase mixture having regard to the O/A volume ratios used.

The contact time under agitation for 5 minutes was selected as representing the maximum residence time in the mixing part of an extractor such as used in a typical U/Pu partitioning scheme of the PUREX method.

According to the reduction equilibrium of plutonium(IV) to plutonium(III) by uranium(IV) indicated previously, ½ mole uranium(IV) is consumed per mole of plutonium(III) produced.

In these tests, the amount of uranium(IV) initially contained in the aqueous phases is about 1.3-1.4 times higher than the amount of plutonium(IV) initially contained in the organic phases. This excess of reducing agent was chosen to allow evaluation of the amount of uranium(IV) that is over-consumed, i.e. the consumption in addition to consumption solely due to the reducing reaction of plutonium(IV).

After these tests, the concentrations of uranium(IV), plutonium and nitric acid were measured in each of the organic and aqueous phases: by visible spectrophotometry for uranium(IV), by α-spectrophotometry for plutonium and by potentiometric titration for nitric acid.

The results of these measurements show that after a contact time of 5 minutes, the plutonium has quantitatively passed into the aqueous phase in oxidation state III (characteristic double peak at λ=560-600 nm), with an extremely low coefficient of distribution, comparable in the three tests ($D_{Pu}$=0.02). The reducing reaction of plutonium(IV) has therefore truly taken place.

Figure 2:
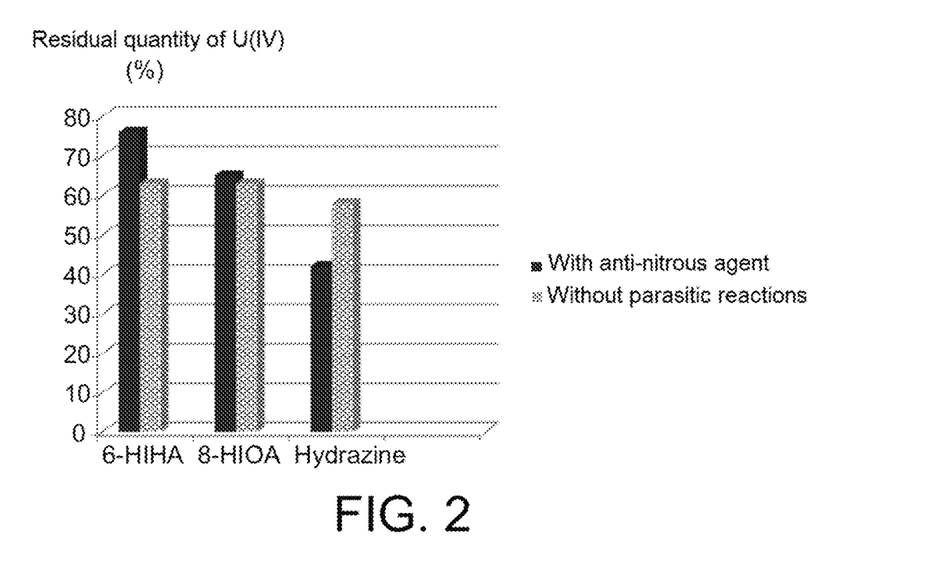
FIG. 2, in the form of a bar chart, illustrates the residual amounts of uranium(IV), expressed as percentages of the initial quantities of uranium(IV), such as obtained in reductive stripping tests of plutonium conducted using either 6-hydroxyiminohexanoic acid or 8-hydroxyiminooctanoic acid or hydrazine as anti-nitrous agent (bars «With anti-nitrous agent»); in comparison, this Figure also indicates, for each anti-nitrous agent, the expected residual amounts of uranium(IV) for a consumption of uranium(IV) that is solely related to the reduction of plutonium(IV) to plutonium(III) by this reducing agent (bars «Without parasitic reactions»).

FIG. 2 shows the residual quantities of uranium(IV), expressed as percentages of the initial quantities of uranium (IV), obtained for the three tested anti-nitrous agents (6-HIHA, 8-HIOA and hydrazine), and the expected residual quantities of uranium(IV) for a consumption of uranium(IV) that is solely related to the reduction of plutonium(IV) by this reducing agent.

As shown in this Figure, the quantities of uranium(IV) consumed in the presence of 6-HIHA and 8-HIOA are equivalent, even lower, than those expected for mere reduction of plutonium(IV) to plutonium(III). On the other hand, for hydrazine, an over-consumption of uranium(IV) is observed under the same operating conditions since there only remains 42% of uranium(IV) whereas there should remain 58% according to the stoichiometry of said reducing reaction.

Figure 3:
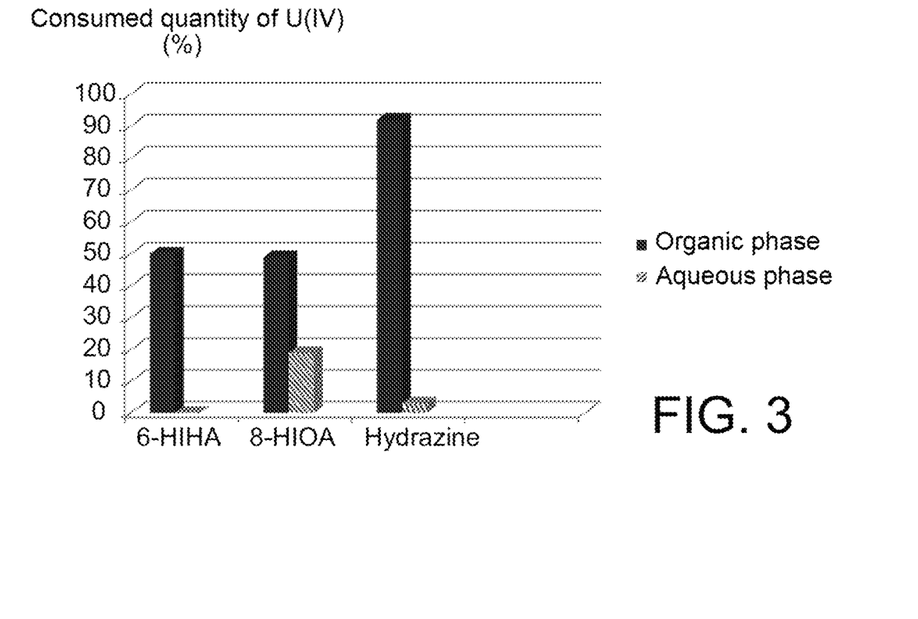
FIG. 3, in the form of a bar chart, illustrates the quantities of uranium(IV) consumed in organic phase and aqueous phase, such as obtained in reductive stripping tests of plutonium conducted using either 6-hydroxyaminohexanoic acid or 8-hydroxyaminooctanoic acid or hydrazine as anti-nitrous agent, these quantities being expressed as percentages of expected quantities of uranium(IV) if uranium(IV) had only been distributed between the two phases.

FIG. 3 shows the quantities of uranium(IV) consumed in organic phase and aqueous phase, obtained for the three tested anti-nitrous agents (6-NINA, 8-HIOA and hydrazine) and expressed as percentages of the expected quantities of uranium(IV) if uranium(IV) had solely been distributed between the two phases.

This shows that, as expected, uranium(IV) is mostly consumed in organic phase since the reducing of plutonium (IV), initially contained in the organic phase, takes place in this phase. It also shows that uranium(IV) is less consumed in the presence of 6-HIHA or 8-HIOA than in the presence of hydrazine, thereby confirming the fact that hydroxyiminoalkanoic acids have greater anti-nitrous properties than hydrazine.

In the presence of hydrazine, the consumption of uranium (IV) in organic phase is practically twice higher than in the presence of 6-HIHA or 8-HIOA since, contrary to the latter, hydrazine is not extractable in organic phase. On the other hand, uranium(IV) is scarcely consumed in aqueous phase.

In the presence of 6-HIHA or 8-HIOA, uranium(IV) is consumed normally in the organic phase, i.e. in an amount needed to allow the reduction of plutonium. In aqueous phase, 6-HIHA appears to be just as efficient and even more efficient than hydrazine for stabilising uranium(IV) since there is no consumption of this reducing agent in the presence of this anti-nitrous agent.

The operating conditions under which the foregoing tests were conducted and the results obtained for these tests are given in Table 1 below.

TABLE I

| Anti-nitrous agent | 6-HIHA | 8-HIOA | Hydrazine |
|---|---|---|---|
| Initial conditions | | | |
| O/A volume ratio | 1.3 | 1.3 | 2 |
| Weight ratio U(IV) in aqueous phase/Pu(IV) in organic phase | 1.4 | 1.4 | 1.3 |
| [U(IV)] in aqueous phase (g/L) | 8.9 | 8.9 | 12.6 |
| [U(IV)] in aqueous phase (mol/L) | 0.037 | 0.037 | 0.053 |
| [HNO$_3$] in aqueous phase (mol/L) | 1.0 | 1.0 | 1.0 |
| [Pu(IV)] in organic phase (g/L) | 4.6 | 4.6 | 4.9 |

TABLE I-continued

| Anti-nitrous agent | 6-HIHA | 8-HIOA | Hydrazine |
|---|---|---|---|
| [anti-nitrous agent] in organic phase (mol/L) | 0.13 | 0.13 | — |
| [anti-nitrous agent] in aqueous phase (mol/L) | — | — | 0.26 |
| $D_{anti\text{-}nitrous\ agent}$ | 0.45 | 0.43 | 0 |
| $D_{U(IV)}$ | 0.8 | 0.8 | 0.8 |
| Aqueous phase after contacting (5 min) | | | |
| [anti-nitrous agent] estimated without consumption (mol/L) | 0.11 | 0.11 | 0.26 |
| [U(IV)] estimated without consumption (mol/L) | 0.018 | 0.018 | 0.020 |
| Estimated quantity of anti-nitrous agent without consumption | 63% | 64% | 100% |
| Estimated quantity of U(IV) without consumption | 48% | 48% | 38% |
| [U(IV)] estimate without consumption (g/L) | 4.3 | 4.3 | 4.8 |
| Measured [U(IV)] (g/L) | 4.4 | 3.5 | 4.7 |
| Quantity of consumed U(IV) in aqueous phase | 0% | 19% | 3% |
| Measured [U(IV)] (mol/L) | 0.019 | 0.015 | 0.020 |
| Measured [Pu] (g/L) | 6.6 | 6.6 | 11 |
| Measured [Pu] (mol/L) | 0.028 | 0.027 | 0.045 |
| Measured [HNO$_3$] (mol/L) | 0.90 | 0.82 | 0.99 |
| Aqueous volume (mL) | 3 | 3 | 3 |
| Organic phase after contacting (5 min) | | | |
| [anti-nitrous agent] estimated without consumption (mol/L) | 0.049 | 0.047 | 0 |
| [U(IV)] estimated without consumption (mol/L) | 0.014 | 0.14 | 0.016 |
| Estimated quantity of anti-nitrous agent without consumption | 38% | 36% | 0% |
| Estimated quantity of U(IV) without consumption | 52% | 52% | 62% |
| [U(IV)] estimated without consumption (g/L) | 3.4 | 3.4 | 3.9 |
| Measured [U(IV)] (g/L) | 1.70 | 1.74 | 0.3 |
| Quantity of U(IV) consumed in organic phase | 50% | 49% | 92% |
| Measured [Pu] (g/L) | 0.11 | 0.09 | 0.23 |
| Organic volume (mL) | 4 | 4 | 6 |
| $D_{Pu}$ | 0.017 | 0.014 | 0.021 |
| Pu balance | 110% | 108% | 113% |
| Residual U(IV) balance | 76% | 65% | 42% |
| Residual U(IV) balance without parasitic reactions | 63% | 63% | 58% |

2.3—Ageing of the Organic and Aqueous Phases Once Separated

To evaluate whether, for hydroxyimino alkanoic acids, there is a risk of oxidation of uranium(IV) to uranium(VI) and of reoxidation of plutonium(III) in all the stages dedicated to the U/Pu partitioning in a typical scheme of the PUREX method, the concentration of uranium(IV) in the organic and aqueous phases obtained after the stripping tests conducted under item 2.2 above, using 6-NINA and 8-HIOA as anti-nitrous agents, was monitored by visible spectrophotometry for several hours after their separation from one another.

According to the O/A flow rates conventionally used in an industrial scheme or pilot test scheme of the PUREX method, the residence time of the aqueous phase in the extractors in which the operations conventionally known as «Pu stripping» and «U washing» for the U/Pu partitioning are conducted, does not exceed four hours whilst it is no more than two hours for the organic phase. The monitoring of the concentrations was therefore carried out over a time of 3 to 4 hours.

Figure 4A:
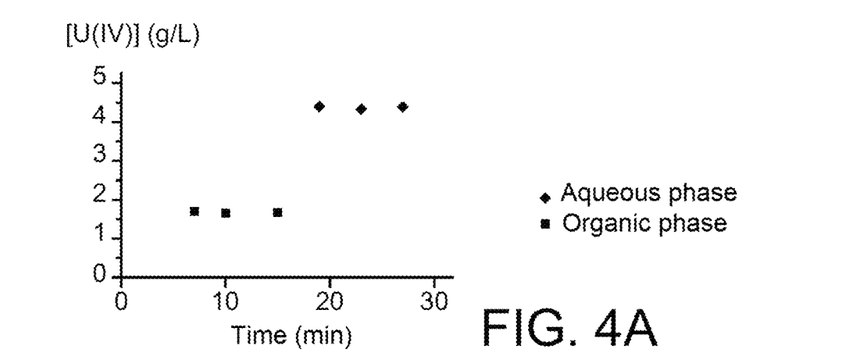
FIGS. 4A and 4B illustrate the trend in time (expressed in minutes in FIG. 4A and in hours in FIG. 4B) of the concentration of uranium(IV) in an organic phase and aqueous phase resulting from a reductive stripping test of plutonium conducted using 6-hydroxyaminohexanoic acid as anti-nitrous agent.
Figure 4B:
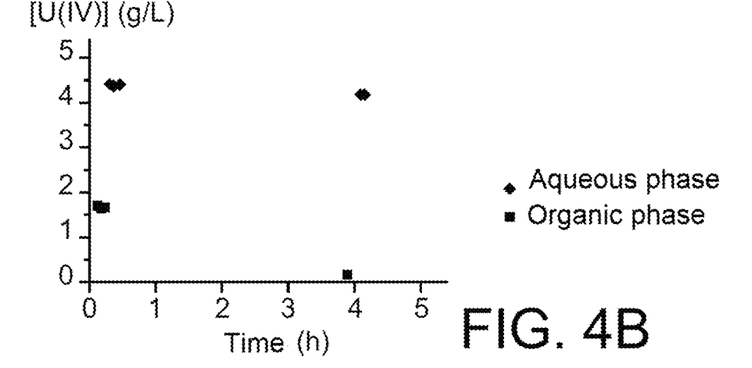
Figure 5A:
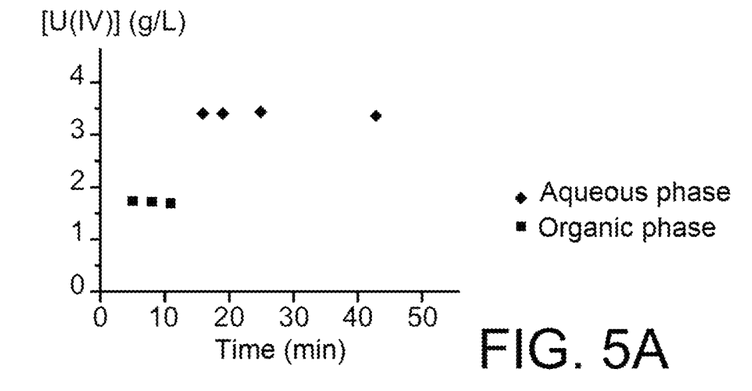
FIGS. 5A and 5B illustrate the trend in time (expressed in minutes in FIG. 5A and in hours in FIG. 5B) of the concentration of uranium(IV) in an organic phase and aqueous phase resulting from a reductive stripping test of plutonium conducted using 8-hydroxyiminooctanoic acid as anti-nitrous agent.
Figure 5B:
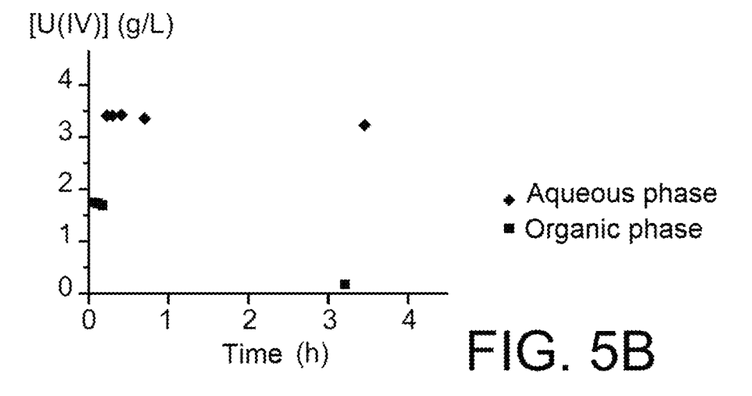

The results are given in FIGS. 4A and 4B for 6-HIHA and in FIGS. 5A and 5B for 8-HIOA, FIGS. 4A and 5A corresponding to the concentrations of uranium(IV) measured over the first 30 minutes following after separation of the organic and aqueous phases, and FIGS. 4B and 5B corresponding to the concentrations of uranium(IV) measured over the entire length of monitoring time.

As shown in these Figures, the concentration of uranium (IV), mixed with all the plutonium(III) in aqueous phase, is stable: there is therefore no risk of reoxidation of plutonium (III), or of oxidation of uranium(IV) in aqueous phase. In organic phase containing most of the nitrous acid, even if the concentration of uranium(IV) shows a greater reduction, the stability remains compatible with overall residence times of less than two hours since there remains some uranium(IV) after an ageing time of 3 hours.

This means that 6-HIHA and 8-HIOA stabilise uranium (IV) sufficiently against its reoxidation by nitrous acid in organic and aqueous phases, so that it is maintained in sufficient quantity even after an ageing time of several hours.

In all cases, the plutonium remained at oxidation state III during these few hours of ageing, which is the targeted objective for an efficient stripping of this actinide from an organic phase formed of TBP in HIP towards an aqueous nitric phase.

2.4—Management of 6-Hydroxyiminohexanoic and 8-Hydroxyiminooctanoic Acids Downstream of a Reductive Stripping Operation of Plutonium As shown in Table 1, most of the 6-HIHA and 8-HIHA after a reductive stripping of plutonium, is essentially in found in aqueous phase. Only a small proportion of these anti-nitrous agents remain in the organic phase.

In a typical scheme of the PUREX method, the operation performed downstream of the reductive stripping of plutonium at the U/Pu partitioning step allows the stripping of uranium(VI) from the organic phase derived from this stripping operation towards an aqueous phase which comprises from 0.01 mol/L to 0.05 mol/L of nitric acid (ratio of O/A flow rates close to 1, temperature of 45° C.). The organic phase thus purified of plutonium and uranium is then reprocessed for recycling thereof using an aqueous solution comprising 0.3 mol/L sodium carbonate, followed by an aqueous solution comprising 0.1 mol/L sodium hydroxide (ratios of O/A flow rates 10-20, temperature of 45° C.).

Stripping tests were therefore carried out using:
  as organic phases: two phases the first comprising 30% (v/v) of TBP in HTP and 0.05 mol/L of 6-NINA, and the second 0.05 mol/L of 8-HIOA; and as aqueous phases: aqueous solutions mimicking those in terms of acidity or basicity respectively used in a typical scheme of the PUREX method to strip uranium (VI) and regenerate the organic phase for recycling thereof.

These tests were conducted at ambient temperature using an O/A volume ratio of 1 and a contact time between the organic and aqueous phases of 2 minutes under agitation.

Measurements of the concentration du 6-NINA and 8-HIOA in the aqueous phases (by high performance liquid chromatography) and in the organic phases (by gas phase chromatography) obtained after these tests showed that the coefficients of distribution of 6-NINA and 8-HIOA are near-constant for acidities of between 0.01 mol/L and 0.05 mol/L. On the other hand, they also show that 6-HIHA and 8-HIOA pass quantitatively into the aqueous phase after only one contacting with a sodium hydroxide solution if the amount of base contained in this solution is sufficient to neutralise the fraction of these compounds contained in the organic phase.

These anti-nitrous agents can therefore easily be removed from the organic phase resulting from stripping of uranium (VI), via the basic treatment to which this organic phase is subjected in a typical scheme of the PUREX method, for recycling thereof.

CITED REFERENCES

[1] WO-A-2006/072729
[2] WO-A-2011/000844
[3] WO-A-2008/148863
[4] FR-B-1 349 281
[5] Ishigaki et al., *Bull. Chem. Soc. Jap.*, 1977, 50(3), 726-730
[6] Ayorinde et al., *J. Am. Oil Chem. Soc.*, 1997, 74(5), 531-538
[7] Jackman et al., *J. Org. Chem.*, 1982, 47(10), 1824-1831
[8] Thiele et al., *ACS Chem. Biol.*, 2012, 7(12), 2004-2011
[9] US-A-2008/0306153
[10] Rajabi et al., *Synth. Comm.*, 2014, 44(8), 1149-1154
[11] Utsukihara et al., *Tet. Lett.*, 2006, 47(52), 9359-9364
[12] Carrera et al., *Tet. Lett.*, 2009, 50(38), 5399-5402
[13] Bouet et al., *Tet. Asym.*, 2008, 19(20), 2396-2401

The invention claimed is:

1. A method of reductive stripping of plutonium from an organic non-water miscible phase comprising an extracting agent and plutonium at an oxidation state IV in an organic diluent, comprising:
   contacting the organic phase with an aqueous phase comprising a reducing agent capable of reducing plutonium(IV) to plutonium(III) and nitric acid; then
   separating the so contacted organic and aqueous phases;
   wherein the organic phase or the aqueous phase further comprises at least one anti-nitrous agent, the antinitrous agent being a hydroxyiminoalkanoic acid of general formula O═C(OH)—(R)—CH═N—OH where R is a straight-chain or branched alkylene group having at least 2 carbon atoms.

2. The method of claim 1, wherein R is an alkylene group having 2 to 12 carbon atoms.

3. The method of claim 2, wherein R is a straight-chain alkylene group having 3 to 8 carbon atoms.

4. The method of claim 3, wherein the hydroxyiminoalkanoic acid is 6 hydroxyiminohexanoic acid or 8-hydroxyiminooctanoic acid.

5. The method of claim 1, wherein the extracting agent is a tri-n-alkyl phosphate.

6. The method of claim 5, wherein the extracting agent is tri-n-butyl phosphate.

7. The method of claim 1, wherein the reducing agent is uranium(IV), hydroxylammonium nitrate, alkylated derivatives of hydroxylamine, ferrous sulfamate or sulfamic acid.

8. The method of claim 7, wherein the reducing agent is uranium(IV) or hydroxylammonium nitrate.

9. The method of claim 1, wherein the aqueous phase comprises from 0.02 mol/L to 0.6 mol/L of the reducing agent.

10. The method of claim 9, wherein the aqueous phase comprises from 0.05 mol/L to 0.4 mol/L of the reducing agent.

11. The method of claim 1, wherein the organic phase or the aqueous phase comprises from 0.01 mol/L to 3 mol/L of the hydroxyminoalkanoic acid.

12. The method of claim 11, wherein the organic phase or the aqueous phase comprises from 0.03 mol/L to 0.5 mol/L of the hydroxyminoalkanoic acid.

13. The method of claim 1, which is implemented in a PUREX method or a COEX method.

* * * * *

UNITED STATES PATENT AND TRADEMARK OFFICE
CERTIFICATE OF CORRECTION

PATENT NO. : 10,354,765 B2  
APPLICATION NO. : 15/768780  
DATED : July 16, 2019  
INVENTOR(S) : Xavier Heres et al.

Page 1 of 1

It is certified that error appears in the above-identified patent and that said Letters Patent is hereby corrected as shown below:

In the Specification

Column 8, Line 27, "6-NINA, 8-HIOA" should read --6-HIHA, 8-HIOA--.

Column 10, Line 29, "(6-NINA, 8-HIOA and hydrazine)" should read --(6-HIHA, 8-HIOA and hydrazine)--.

Column 11, Line 42, "6-NINA and 8-HIOA" should read --6-HIHA and 8-HIOA--.

Column 12, Line 43, "HIP" should read --HTP--.

Column 12, Line 66, "6-NINA" should read --6-HIHA--.

Signed and Sealed this  
Twenty-second Day of October, 2019

Andrei Iancu  
*Director of the United States Patent and Trademark Office*